United States Patent [19]

In Son

[11] 4,193,678
[45] Mar. 18, 1980

[54] SHUTTER STRIKER COCKING MECHANISM

[75] Inventor: Kwok In Son, Hong Kong, Hong Kong

[73] Assignee: W. Haking Enterprises Limited, Hong Kong

[21] Appl. No.: 929,523

[22] Filed: Jul. 31, 1978

[51] Int. Cl.² .......................... G03B 17/42; G03B 9/10
[52] U.S. Cl. ...................................... 354/204; 354/250
[58] Field of Search ............... 354/204, 206, 212, 213, 354/250, 251

[56] References Cited

U.S. PATENT DOCUMENTS 3,728,950  4/1973  Lange .................................... 354/204

FOREIGN PATENT DOCUMENTS 2161922  6/1973  Fed. Rep. of Germany ........... 354/204
2220453  11/1973  Fed. Rep. of Germany ........... 354/206
2405613  8/1975  Fed. Rep. of Germany ........... 354/250

*Primary Examiner*—Donald A. Griffin
*Attorney, Agent, or Firm*—Wallenstein, Spangenberg, Hattis & Strampel

[57] ABSTRACT

In a camera including a shutter member, a spring urged striker member adapted to be moved from an initial position to a fully cocked position and then released to strike the shutter member to cause the shutter member to move momentarily away from the lens opening of the camera, a drive gear is provided for moving the striker member from an initial to a fully cocked position during only part of the movement of a manually operable film winder member during a film winding operation. The striker member includes a gear segment including a toothed portion provided with teeth meshable with gear teeth of a first portion of the drive gear and a dead motion portion free of gear teeth so that further movement of said drive gear will not move the striker member beyond the fully cocked position, the striker member being held in the fully cocked position by the abutment of the last tooth of the gear segment with the drive gear.

22 Claims, 8 Drawing Figures

U.S. Patent   Mar. 18, 1980   Sheet 1 of 3   4,193,678
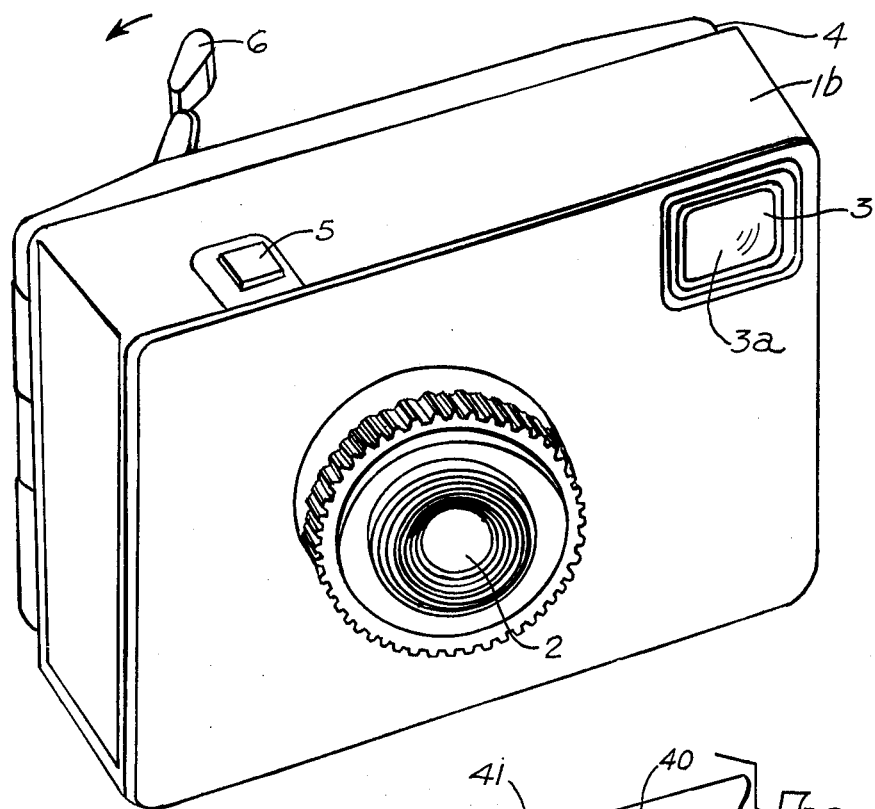
FIG. 1
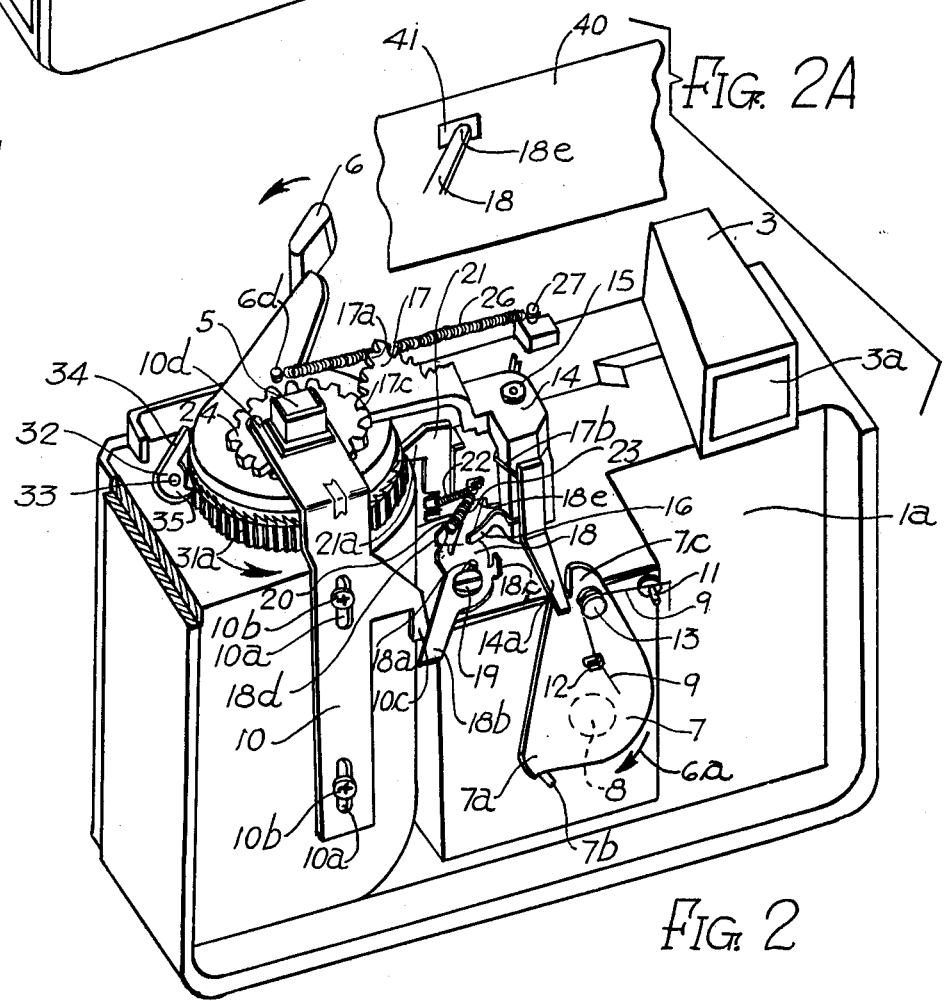
FIG. 2A
FIG. 2

SHUTTER STRIKER COCKING MECHANISM

BACKGROUND AND SUMMARY OF INVENTION

This invention relates to still cameras and to mechanisms therein for winding the film and cocking a striker member, and which operates the shutter when a manually operable shutter or striker operating button is depressed.

Such cameras commonly include clutching mechanism which, upon actuation of the film winding arm or film winding wheel thereof, engages both the striker cocking means and the film winding mechanism. In this connection, it is important that neither more nor less than the desired length of film is advanced, such that upon film exposure no overlapping of portions of pictures occurs in case of too little film transport, or in case of excessive film transport film material is not unnecessarily wasted. In modern pocket cameras of the cartridge type, the film advance is determined by metering apertures in the film spaced one film frame apart. A film sensing member scans the film to locate the next film metering aperture, and when the film sensing member falls into a metering aperture the film winding member becomes locked against further movement. Also, during the film winding operation, a shutter blade striker member is cocked. The termination of the film cocking and film winding operations will generally occur at different times, and so there must be provided a lost motion coupling to permit the manually operable film winding arm or wheel to continue its movement even though a cocking operation has terminated. Such lost motion mechanism has often comprised a slip clutch.

It is an object of the invention to provide a simpler lost motion mechanism than heretofore used for the purpose just described, which will retain the shutter striker member in the cocked position even when the film winding is continued. Another object of the invention is to provide a simple combined film winding and striker member cocking and release mechanism which operates with a reciprocating film winding member.

The slip clutching arrangement heretofore required so far is replaced in the invention practically by two force transmitting members, a driving gear and a gear segment which is provided with teeth only over a limited portion thereof and a dead motion portion. The dead motion portion always operates so that the driving connection between the driving gear and the gear segment is interrupted thereby in the shutter cocking driving direction. When the driving gear meshes with the gear portion of the gear segment, the gear segment and thus the striker member will be driven upon turning of the driving gear, preferably against the force of a biasing spring. When the gear segment is disengaged from the teeth of the driving gear because the dead motion portion is opposite the teeth of the gear, further driving of the striker member is interrupted automatically. Due to the fact that the last tooth of the gear portion, at the point of transition to the dead motion portion, is urged against a tooth of the driving gear under the action of a biasing spring, the striker member cannot snap back into the initial position provided the driving gear is prevented from moving in reverse direction of rotation. This is readily accomplished by a ratchet mechanism disposed between the film winder arm and the driving gear which allows the driving gear to be driven only in one direction (shutter cocking direction). To release the shutter and return the striker member into the initial position, it is sufficient to disengage the gear segment from the driving gear, which may readily be accomplished by urging the driving gear out of the plane of the gear segment, so that the aforementioned last tooth of the gear portion of the gear segment can no longer rest against a tooth of the driving gear and the biasing spring pulls or urges the gear segment back into its initial position. Thus, while this especially axial disengagement of the driving gear and gear segment has not yet occurred, the striker member will be maintained in the cocked position without use of a specific clutching arrangement.

On use of a one-way acting ratchet drive as a driving connection between the film winding arm and the driving gear, a simplified film winding system is provided by means of which the film may be wound in one direction only, for which purpose especially a circular or even a straight motion component is used as driving motion (upon actuation of the film winding arm).

Furthermore, due to the simple structure and small number of components, the invention results not only in a reduction of the manufacturing costs of the individual components themselves, but also in a reduction of the costs of assembly. Also, space-saving advantages result from this simpler construction.

Further embodiments and improvements of the invention are claimed in the subclaims and are apparent from the following description of the drawing. In this respect also, those further embodiments are highly advantageous and even independently inventive which relate to the combination of the shutter cocking mechanism with the film winding mechanism and the locking of the release push button in accordance with the invention.

DESCRIPTION OF DRAWINGS

FIG. 1 is a perspective view from the front and the top of a camera including the features of the invention;

FIG. 2 is a corresponding view of the camera after removal of some of the housing parts thereof;

FIG. 2A shows the film sensing finger of the camera near a film metering aperture of the film;

FIG. 3A shows a perspective view of the holding member shown in FIG. 3, as viewed from the opposite side there shown;

FIG. 3B is a perspective view of the film winder arm member shown in FIG. 3, as viewed from the opposite side there shown;

DESCRIPTION OF EXEMPLARY FORM OF INVENTION

Figure 3:
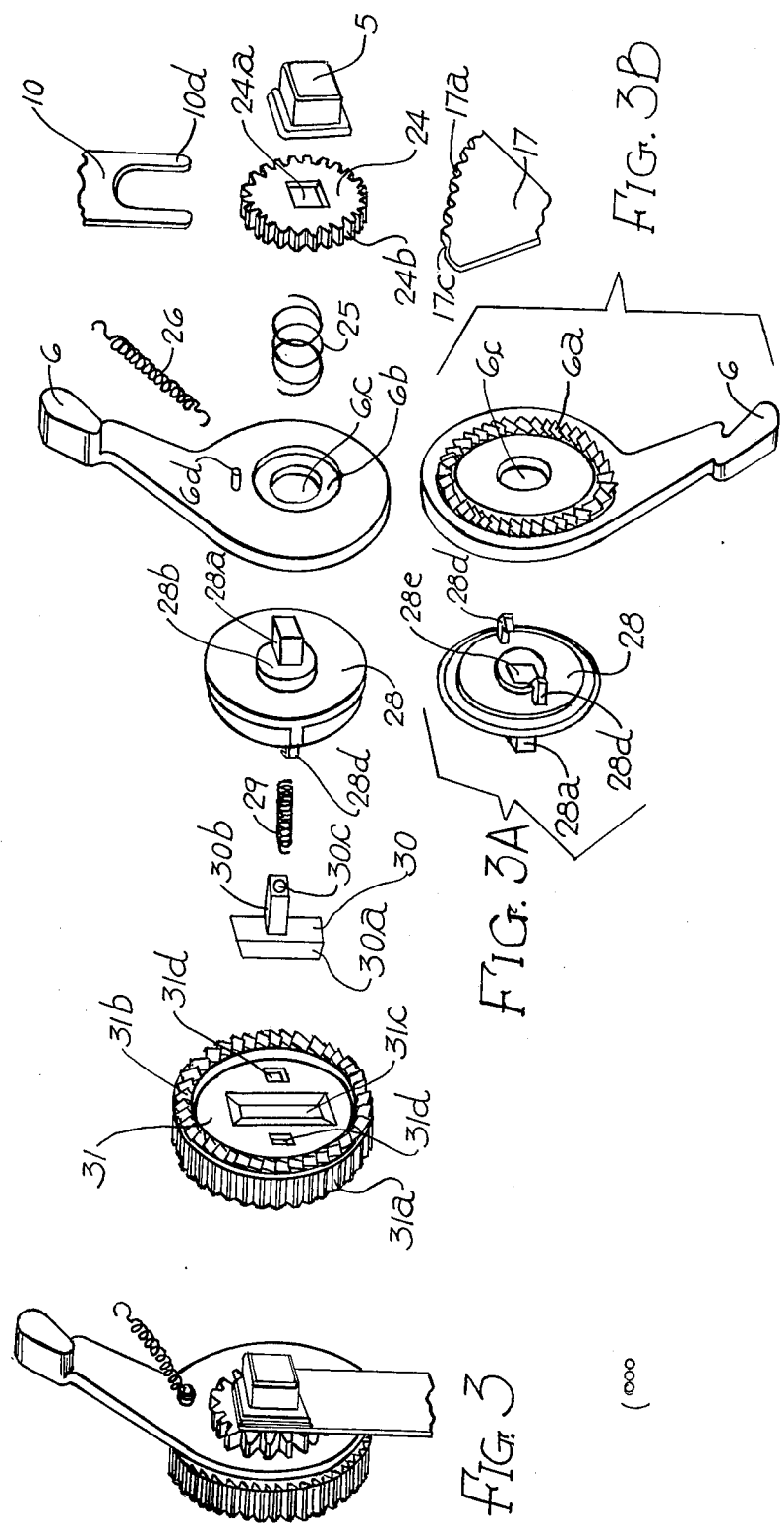
FIG. 3 is an exploded perspective view of the individual components making up the film winding and shutter cocking mechanism of the camera of FIGS. 1 and 2.

The camera housing is shown including a front wall 1, a top wall 1b, and a back wall 4. The objective lens 2 is disposed at the front of the camera, and the front or objective-side viewfinder lens 3a of the viewfinder 3 is also disposed thereat. On the top of the camera the release push button 5 is provided, and at the back the film winder arm member 6 is disposed.

The construction of the camera mechanism is best understood with reference to FIG. 2. The exposure of the film takes place by moving a shutter blade 7 in a clockwise direction, as shown by an arrow 6a, whereby the camera aperture 8 behind the same is exposed. The clockwise movement of the shutter blade 7 is caused by a counter-clockwise movement of a striker arm 14a of a striker member 14 striking a tab 7c of the shutter blade 7. The striker member 14 is shown pivotable about a vertical pivot 15. The movement of the shutter blade 7, which is pivoted at pivot 13, occurs against the force of a spring 9 anchored between tabs 11 and 12. Following the counter-clockwise movement of the striker arm 14a, the shutter blade 7 is urged by the spring 9 in a counter-clockwise direction. The initial position of the shutter blade 7 is maintained by a pin 7b of the camera frame 1a, against which the tab 7a abuts.

In addition to the striker arm 14a, the striker member 14 has a gear arm or gear segment 17 and a spring arm 16. The striker member 14 is constantly urged in a counter-clockwise direction by a spring 17b. During striker release, the spring arm 16 engages an upright tab 18c of a film sensing member 18. The gear segment 17 of the striker member 14 has gear teeth 17a forming a gear portion and a flat portion not provided with gear teeth forming a dead motion portion 17c at the front end of the striker member 14, the end facing toward the front of the camera. In the cocked condition of the striker member 14, the gear segment 17 is positioned at the rear of the camera, and the flat or dead motion portion 17c rests against the gear teeth 24b of a drive gear 24.

Figure 5:
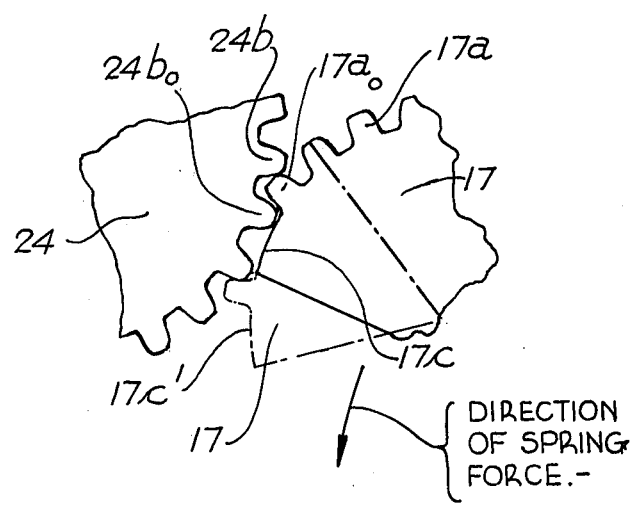
FIG. 5 is a schematic front view of a part of the drive gear and the striker member gear segment in which the dead motion portion of the gear segment is opposite the drive gear.

FIG. 5, shows in full lines the cocked condition of the gear segment 17 and the dashed lines show the uncocked or released condition of the gear segment 17, into which the gear segment 17 is urged by the force of spring 17b, which is shown only schematically. Thus, in the cocked condition of the striker member as shown in FIG. 5, a drive gear tooth $24b_0$ is engaged by the last tooth $17a_0$ of the gear segment portion 17a at the transition to the dead motion portion 17c so that the drive gear tooth $24b_0$ prevents return motion of the gear segment 17 to its uncocked condition. In other words, the biasing spring 17b urges the gear segment 17 opposite to the driving direction of the drive gear 24 in such a manner that the last tooth $17a_0$ of the gear segment is continuously urged into engagement with a tooth of the drive gear 24 which slips by the last segment tooth $17a_0$, even as the drive gear continuous to rotate, as long as the drive gear 24 has not been moved out of the path of this last tooth $17a_0$, which may readily occur by axially moving the driving gear 24. In such case, the camera is in its cocked condition and ready for a picture-taking operation, as shown in full lines in FIG. 5 and in the perspective view of FIG. 2.

In this cocked condition of the camera, the spring arm 16 is disengaged from the upright tab 18c of the film sensing member 18 which is urged by a spring 20 towards the back of the camera. In this condition, a film sensing finger 18e of the film sensing member 18 protrudes from the back of the inner camera structure and contacts the film 40 (FIG. 2A) where it is ready to drop into a metering aperture 41 on the film when the aperture passes by the finger 18e.

Even if the film sensing finger 18e in this cocked condition has not dropped into the aperture 41 in the film 40, the spring 20 has the further function of pulling the film sensing finger 18e towards the left. (Such apertures are spaced one frame distance apart along the film 40.) As the film sensing member 18 is pivoted on the pin 19, the extension or detent 18b thereof is moved towards the right. In this manner the detent 18b is in the path of the arm 10c of a striker release member 10. Consequently, the striker release member 10 cannot be depressed, and no shutter operation is possible.

The engagement of the spring arm 16 with the stop or tab 18c of the film sensing member 18 during striker release urges the film sensing member 18 towards the front of the camera. The movement is governed by a slot 18a in the film sensing member 18 into which the pin 19 extends. The forward movement of the film sensing member 18 occurs against the action of the spring 20, which is positioned between the protruding tab 18d and the camera frame 1a. However, the spring force exerted by the spring 17b at the striker member 14 is much higher than the force exerted by the spring 20 on the film sensing member 18 resting against the spring arm 16. Thus, in its released position the film sensing member 18 is in the disengaged or "outward" position. In this outward position the detent 18b of the film sensing member 18 is in the path of an arm 10c of the striker release member 10 so that no further release by additional depression of the striker release member 10 or the release button 5 can occur.

Shutter operation by release of the cocked striker member is only possible when the film sensing finger 18e drops into a metering aperture 41 of the film 40 and is moved thereby into a leftmost position. Then, the detent 18b is moved towards the right out of the path of the arm 10c.

The movement of the finger 18e into the leftmost position results in a movement of a control member 21 towards the left. This motion transmission takes place by means of the film sensing member 18 acting on a notch 23 of the control member 21. This movement to the left also results in the engagement of an arm 21a of the control member 21 with the gear teeth 31a of the film winding gear 31, which stops the further turning of the film winding gear 31. The movement of the film sensing finger 18e and of the control member 21 to the left takes place against the force of the springs 20 and 22.

The shutter operation takes place by depression of the release push button 5 and the striker release member 10, since in this condition the detent 18b is moved out of the path of the arm 10c. The release member 10 then can be further depressed such that a forked arm 10d thereof presses the drive gear 24 downwardly against the force of a spring 25 (FIG. 3). Screws 10b (FIG. 2) extend through slots 10a of the striker release member 10 and permit the striker release member 10 to be guided upwardly and downwardly. When the drive gear 24 is in a plane extending out of the plane of the gear segment 17 of the striker member 14, the gear segment 17 and the striker member 14 are free to spring back in a counter-clockwise direction, resulting in the striker arm 14a striking tab 7C on the shutter blade, so that the shutter blade moves away from the aperture 8 to uncover the same. The spring-back action of the striker member 14 also results in the spring arm 16 striking the tab 18c of the film sensing member 18 to remove the film sensing finger 18e from the metering aperture 41. After the release of the finger 18e from the aperture 41, the film sensing member 18 and the control member 21 are urged or pulled by the springs 20 and 22 into their rightmost position. Film winding gear 31 is then free to be moved for film winding, since the control member 21 is disengaged from the gear teeth 31a.

Figure 4:
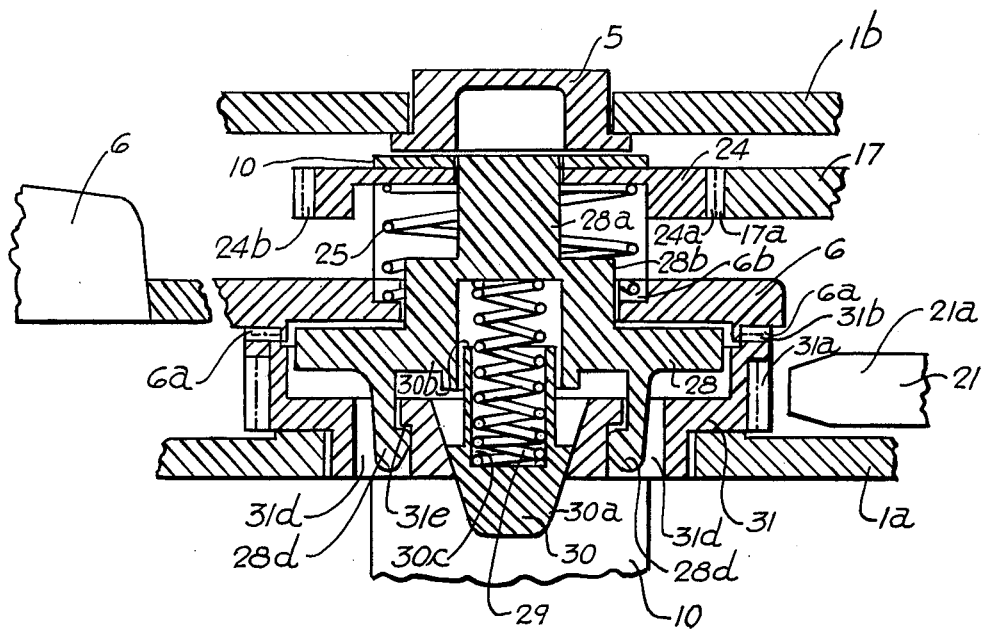
FIG. 4 is a cross-sectional view of the assembled unit according to the left-hand part of FIG. 3.

As shown in FIGS. 3 and 4, the film winding mechanism includes a film winding member 30 having a wedge-like or tapered part 30a adapted to engage with the film winding portion of a film cartridge (not shown). The film winding member 30 further includes a square pin 30b formed with a circular hole 30c. This hole 30c is blocked at one end and is used to house a spring 29 which applies its force against the film winding member 30 and a holding or connecting member 28. The film winding member 30 is mated with a rectangular, inwardly tapering hole 31c of the film winding gear 31 in such a manner that it is free to move axially but cannot fall out of the tapering hole 31c. This movement is significant, because during loading of the film cassette the film winding member 30 is forced upwardly against the spring 29. After loading of the cassette, the spring 29 forces the film winding member 30 downwardly to engage the member 30 with the film winding portion of the film cartridge.

The holding member 28 is attached to the film winding gear 31 by means of two hooks 28d, which extend through two rectangular holes 31d in the film winding gear 31 to become latched within a recess 31e (FIG. 4) therein. Thus, rotational movement is coupled to the holding member 28 through the two hooks 28d from the film winding gear 31, and the holding member drives the film winding member 30. The hooks 23d also aid in interlocking the holding member 28, the film winding gear 31, the film winding member 30, and the spring 29, into a single unit which rotates in unison. The holding member 28 has a collar 28b on the side of the square pin 28a which collar fits into the circular recess 6c of the film winder arm member 6 (FIG. 4). The recess 28e of member 28 receives the spring 29 as does the recess 30c in the square pin 30b of the film winding member 30.

The rotation of this combined unit occurs on account of the counter-clockwise movement of the film winder arm member 6 which has one way driving ratchet teeth 6a engaging ratchet teeth 31b of the film winding gear 31. Counter-clockwise movement of film winder arm member 6 causes engagement of these ratchet teeth resulting in movement of the film winding member 30 when winding of the film takes place. This design of the ratchet teeth 6a and 31b results in the slipping of the ratchet teeth 6a over the ratchet teeth 31b for clockwise movement of the film winder arm member 6. A pawl 35 (FIG. 2) and an arm 34 of a ratchet dog 32 hold the film winding gear 31 stationary even when the film winder arm 6 is moved clockwise. A pivot pin 33 serves to support the ratchet dog 32. Thus, during the return stroke of the film winder arm member 6 no reverse winding of the film occurs.

As best shown in FIGS. 3, 3B and 4, the film winder arm member 6 has a circular hole 6c opening onto a larger recess 6b which defines one end wall against which bears one end of a compression spring 25. The other end of the spring 25 bears against a shoulder on gear 24 for a purpose to be described.

The counter-clockwise movement of the film winder arm member 6 is transmitted to the gear 24 through the engagement of the square pin 30b of the film winding member 30 with the defining walls of a square hole 24a in the drive gear 24. The counter-clockwise movement of the drive gear 24 causes cocking of the striker member 17 by movement of the gear segment 17 in a clockwise direction. The gear segment 17 may only be driven clockwise by the drive gear which only moves in a clockwise direction on account of the ratchet teeth 6a and 31b. When the striker member 1 is fully cocked, the flat or dead motion portion 17c thereof is in contact with a gear tooth 24b of the gear 24 so that any further counter-clockwise winding of the film winder arm 6 would result only in a slipping of the gear teeth 24b over the dead motion portion 17c of the striker member 14.

The gear segment 17 is disengaged from the drive gear by the movement of the gear 24 out of the plane of the gear segment 17, the gear 24 being normally retained in this plane by the action of spring 25. Depression of the striker release push button 5 causes downward movement of the forked arm 10d and the drive gear 24, whereby the same is moved out of the plane of rotation of the gear segment portion 17a. The gear segment 17 is then moved by spring striker member return spring 17b against the shutter blade 7 to expose the film.

It should be understood that numerous modifications may be made in the preferred form of the invention without deviating from the broad aspects thereof.

I claim:

1. In a camera including a shutter member, a striker member adapted to be moved from an initial position to a fully cocked position and then released to strike the shutter member to cause the shutter member to move momentarily away from the lens opening of the camera, a film winding member adapted to communicate a film feeding force to a strip of photographic film, film feeding and striker member cocking means including a manually operable member to be coupled in drive transmitting relation with said film winding member and said striker member, and manually operable striker member release means for releasing said cocked striker member, the improvement in mechanism for interconnecting said manually operable member and said film winding and striker members, said mechanism comprising: drive gear means for moving said striker member from said initial to said fully cocked position during only part of the movement of said manually operable member during a film winding operation, said striker member including a gear segment including a toothed portion provided with teeth meshable with gear teeth of a first portion of said drive gear means to effect the movement of said striker member from said initial to said fully cocked positions and a dead motion portion free of gear teeth so that further movement of said drive gear means will not move said striker member beyond said fully cocked position, said striker member being held in said fully cocked position by the engagement of said gear segment with said drive gear means, transmission means connecting said manually operable member with said film winding member and said drive gear means, and disengaging means responsive to operation of said striker release means for disengaging said gear segment of the striker member from said drive gear means, to release said striker member from said cocked position.

2. The camera of claim 1 wherein one of the drive gear means and said gear segment of said striker member is axially movable out of the plane of the other of same by operation of said disengaging means.

3. The camera of claim 2 wherein the portion of said drive gear means meshing with said gear segment is spring urged into the plane of said gear segment.

4. The camera of claim 3 wherein said gear segment-meshing portion of said drive gear means rests against an arm portion of said shutter release means, said arm portion being moved in opposition to the spring bias applied to said gear segment-meshing portion of said drive gear means when said shutter release means is operated.

5. In a camera including a shutter member, a striker member adapted to be moved from a spring urged initial position to a cocked position against the spring return force thereon and then released to strike the shutter member to cause the shutter member to move momentarily away from the lens opening of the camera, a film winding member adapted to communicate a film feeding force to a strip of photographic film, film feeding and striker member cocking means including a manually operable reciprocable member to be coupled in drive transmitting relation with said film winding member and said striker member, and striker member release means for releasing said cocked striker member, the improvement in mechanism for interconnecting said manually operable reciprocable member and said film winding and striker members, said mechanism comprising: drive gear means for moving said striker member from said initial to said fully cocked position during only part of the movement of said manually operable reciprocable member between the extreme positions thereof and for moving said film winding member a sufficient distance to effect movement of said film one frame distance during the movement of said manually operable reciprocable member between its extreme positions, said striker member including a gear segment meshing with gear teeth of a first portion of said drive gear means which gear segment includes a toothed portion provided with teeth meshable with gear teeth of said first portion of said drive gear means to effect the movement of said striker member between said initial to said fully cocked position and a dead motion portion free of gear teeth so that further movement of said drive gear means will not move said striker member beyond said fully cocked position, said striker member being held in said fully cocked position by the engagement of said gear segment with said drive gear means, transmission means connecting said manually operable reciprocable member with said film winding member and said drive gear means only when said reciprocable member is moved in one direction between its extreme positions, and means responsive to operation of said striker release means for disengaging said gear segment of the striker member from said drive gear means to release said striker member from said cocked position.

6. The camera of any of claims 1 or 5 wherein said striker member is spring urged into said initial position, and upon momentary actuation of said shutter release means the resulting momentary disengagement of the gear segment and said drive gear means permits the toothed portion of said gear segment to return into meshing engagement with the gear of said drive gear means.

7. The camera of any of claims 1 or 5 wherein said striker member is spring urged into said initial position, the spring force upon said striker member causing the last tooth of said gear segment adjacent to the dead motion portion thereof to contact a tooth of said drive gear means, which latter tooth retains the striker member in its fully cocked position.

8. The camera of claims 1 or 5 wherein said striker member is pivotable about a pivot axis and is spring biased in a direction opposed to the direction of movement of said drive gear means upon operation of said manually operable member, and said gear segment is disposed along a circular arc which is coaxial with the pivot axis of said striker member and forms an integral part thereof.

9. The camera of claim 5 wherein said manually operable member is a reciprocable member mounted for rotation about an axis common with the axis of rotation of said film winding member, said drive gear means including a gear member mounted for rotation with said film winding member about said common axis of rotation and there being associated with said film winding member gear means having axially facing one-way driving gear teeth meshing with complementary axially facing gear teeth on said manually operable reciprocable rotatable member, so that said drive gear member is moved only when said manually operable member is rotated in one direction, the engaging teeth thereof slipping relative to one another when said manually operable reciprocable member is moved in the opposite direction.

10. The camera of claims 1 or 5 wherein said transmission means interconnecting said manually operable member with said film winding member comprises a film winding gear having one-way driving gear teeth meshing with gear teeth on said manually operable member so that said drive gear means is moved only when said manually operable member is moved in one direction, the engaging teeth thereof slipping relative to one another when said manually operable member is moved in the opposite direction.

11. A camera comprising: a shutter member, a striker member adapted to be moved from a spring urged initial position to a fully cocked position against the spring return force thereon and then released to strike the shutter member to cause the shutter member to move momentarily away from the lens opening of the camera, a rotatable film winding gear, a manually operable reciprocable and rotatable member mounted for rotation about an axis common with the axis of rotation of said film winding gear, manually operable striker release means for releasing said cocked striker member, a rotatable drive gear for moving said striker member from said initial to said fully cocked position during only part of the movement of said manually operable member between the extreme positions of operation thereof, said drive gear being mounted for rotation with said film winding gear and about said common axis of rotation, coupling means interconnecting said drive gear and said striker member for moving said striker member between said initial and fully cocked positions and including lost motion means for permitting said drive gear to have continued movement after said striker member has reached its fully cocked position, and said film winding gear having axially facing one-way driving gear teeth meshing with complementary axially facing gear teeth on said manually operable reciprocable rotatable member so that said drive gear is moved only when said manually operable member is rotated in one direction, the engaging teeth thereof slipping relative to one another when said manually operable reciprocable member is moved in the opposite direction.

12. The camera of claim 11 wherein said striker member coupling means is a gear segment meshable with gear teeth of said drive gear, which gear segment includes a toothed portion provided with teeth meshable with the gear teeth of said drive gear to effect the movement of said striker member from said initial to said fully cocked position and a dead motion portion free of gear teeth so that further movement of said drive gear will not move said striker member beyond said fully cocked position, said striker member being held in said fully cocked position by the engagement of said gear segment with said drive gear and being disengaged therefrom when said manually operable striker release means is operated.

13. The camera of claim 12 wherein said drive gear is axially moved out of engagement with said gear segment by actuation of said striker release means.

14. The camera of claim 12 wherein the portion of said drive gear meshing with said gear segment is spring urged initially into the plane of said gear segment, said drive gear resting against an arm portion of said striker release means which arm portion is moved in opposition to the spring bias applied to said drive gear when said striker release means is operated.

15. The camera of claim 12 wherein said striker member is spring urged into said initial position, and the momentary actuation of said striker release means results in momentary separation of the drive gear from the toothed portion of said gear segment and the return of the striker member to said initial position where said gear segment returns into meshing engagement with the teeth of said drive gear.

16. The camera of claim 11 wherein there is a holding means interconnecting said film winding gear and said drive gear so that rotation imparted to said film winding gear is also imparted to said drive gear.

17. The camera of claim 16 wherein said holding means includes driver elements engaging the defining walls of holes in said film winding gear.

18. The camera of claim 17 wherein said driver elements are designed in the form of hooks snapped behind the defining walls of said holes.

19. The camera of claim 18 wherein there is provided a film winding member in addition to said film winding gear which film winding member is driven by said holding means, one of said film winding member and holding means is provided with a noncircular recess which receives a projection from the other of same so that they rotate together, said film winding member being axially movable relative to said holding means and spring means within said recess for biasing said film winding member axially into a film winding position.

20. The camera of claim 19 wherein the side of the film winding member opposite to the side facing said holding means projects through a recess in the film winding gear, so that it can make engagement with a film-advancing portion of a film magazine.

21. The camera of claim 1, 5 or 19 wherein the camera is provided with a film sensing member adapted to enter a metering aperture in the film, said striker member having an arm which, upon operation of said striker release means, moves the film sensing member out of the film metering aperture, said camera being further provided with a film winding locking means which is responsive to movement of said film sensing member into said film metering aperture by preventing rotation of said film winding member.

22. The camera of claim 21 wherein there is provided means associated with said film sensing member which prevents operation of said striker release means when the film sensing member is not positioned in said film metering aperture.

* * * * *